US012519218B2

(12) United States Patent
Takata et al.

(10) Patent No.: US 12,519,218 B2
(45) Date of Patent: Jan. 6, 2026

(54) LIQUID CRYSTAL ANTENNA AND METHOD FOR MANUFACTURING LIQUID CRYSTAL ANTENNA

(71) Applicant: NEC Corporation, Tokyo (JP)

(72) Inventors: Koya Takata, Tokyo (JP); Kenji Wakafuji, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 18/276,187

(22) PCT Filed: Dec. 10, 2021

(86) PCT No.: PCT/JP2021/045690
§ 371 (c)(1),
(2) Date: Aug. 7, 2023

(87) PCT Pub. No.: WO2022/209036
PCT Pub. Date: Oct. 6, 2022

(65) Prior Publication Data

US 2024/0106109 A1 Mar. 28, 2024

(30) Foreign Application Priority Data

Mar. 30, 2021 (JP) ................................ 2021-057212

(51) Int. Cl.
*H01Q 1/40* (2006.01)
*H01Q 1/24* (2006.01)
(Continued)

(52) U.S. Cl.
CPC ................ *H01Q 1/40* (2013.01); *H01Q 1/24* (2013.01); *H01Q 21/065* (2013.01); *H01Q 21/20* (2013.01)

(58) Field of Classification Search
CPC .......... H01Q 1/40; H01Q 1/24; H01Q 21/065; H01Q 21/20
See application file for complete search history.

(56) References Cited

U.S. PATENT DOCUMENTS

| | | | |
|---|---|---|---|
| 4,864,312 | A | 9/1989 | Huignard et al. |
| 5,184,233 | A | 2/1993 | Lim et al. |

(Continued)

FOREIGN PATENT DOCUMENTS

| | | | |
|---|---|---|---|
| JP | S64-016002 | A | 1/1989 |
| JP | H04-245803 | A | 9/1992 |

(Continued)

OTHER PUBLICATIONS

International Search Report for PCT Application No. PCT/JP2021/045690, mailed on Mar. 8, 2022.

(Continued)

*Primary Examiner* — Dieu Hien T Duong

(57) ABSTRACT

Please delete the Abstract of the Disclosure, and replace it with the following: Provided are a liquid crystal antenna capable of adapting a transmission/reception direction of a radio wave to 360° in a horizontal direction and reducing a size, a weight, and cost, and a method for manufacturing the liquid crystal antenna. A liquid crystal antenna of the present example embodiment includes a curved liquid crystal panel and is a phased array type, and the liquid crystal panel includes a liquid crystal layer and a plurality of antenna elements that transmit and receive signals having phases modulated by a variable dielectric constant element including the liquid crystal layer. The liquid crystal layer may be curved.

20 Claims, 9 Drawing Sheets

(51) Int. Cl.
*H01Q 21/06* (2006.01)
*H01Q 21/20* (2006.01)

(56) References Cited

U.S. PATENT DOCUMENTS

| | | | | |
|---|---|---|---|---|
| 2013/0082900 | A1* | 4/2013 | Rodriguez | H01Q 9/0414 343/906 |
| 2014/0266897 | A1 | 9/2014 | Jakoby et al. | |
| 2017/0187101 | A1 | 6/2017 | Freeman et al. | |
| 2017/0324148 | A1 | 11/2017 | Stevenson et al. | |
| 2019/0131719 | A1 | 5/2019 | Haziza et al. | |
| 2019/0319325 | A1* | 10/2019 | Zhang | H01P 11/00 |
| 2020/0249516 | A1 | 8/2020 | Tseng et al. | |
| 2021/0242579 | A1* | 8/2021 | Tsai | H01Q 21/061 |

FOREIGN PATENT DOCUMENTS

| | | | |
|---|---|---|---|
| JP | 2014-531843 | A | 11/2014 |
| JP | 2019-505119 | A | 2/2019 |
| JP | 2019-519136 | A | 7/2019 |
| JP | 2020-504811 | A | 2/2020 |
| JP | 2020-096278 | A | 6/2020 |
| JP | 2020-126235 | A | 8/2020 |
| JP | 2021-501532 | A | 1/2021 |

OTHER PUBLICATIONS

IN Office Communication for IN Application No. 202317057177, mailed on Oct. 16, 2025 with English Translation.

* cited by examiner

LIQUID CRYSTAL ANTENNA AND METHOD FOR MANUFACTURING LIQUID CRYSTAL ANTENNA

This application is a National Stage Entry of PCT/JP2021/045690 filed on Dec. 10, 2021, which claims priority from Japanese Patent Application 2021-057212 filed on Mar. 30, 2021, the contents of all of which are incorporated herein by reference, in their entirety.

TECHNICAL FIELD

The present invention relates to a liquid crystal antenna and a method for manufacturing a liquid crystal antenna.

BACKGROUND ART

Patent Literatures 1 to 4 describe liquid crystal antennas each using a liquid crystal layer.

CITATION LIST

Patent Literature

Patent Literature 1: Published Japanese Translation of PCT International Publication for Patent Application, No. 2014-531843

Patent Literature 2: Published Japanese Translation of PCT International Publication for Patent Application, No. 2019-505119

Patent Literature 3: Japanese Unexamined Patent Application Publication No. 2020-096278

Patent Literature 4: Japanese Unexamined Patent Application Publication No. 2020-126235

SUMMARY OF INVENTION

Technical Problem

A liquid crystal antenna has been manufactured at a relatively low cost similarly to a liquid crystal display since a technique used for the liquid crystal display can be utilized. Further, a light and thin liquid crystal antenna has been manufactured.

However, the liquid crystal antenna has a planar shape, and four planar antennas each covering 90° are required in order to obtain an antenna covering 360° such as a front hole. Specifically, it is possible to obtain the antenna covering 360° for example, by arranging four planar antennas on four side surfaces of a rectangular tube. In such an arrangement, a radio wave transmitted and received near a corner portion of the rectangular tube becomes weak. Further, each of the antennas is a multi-element antenna, and thus, a weight increases, and cost increases. Furthermore, a large space is required because the antennas need to be installed so as not to collide with each other.

In view of the above-described problems, an object of the present disclosure is to provide a liquid crystal antenna capable of adapting a transmission/reception direction to 360° in a horizontal direction and reducing a size, a weight, and cost, and a method for manufacturing the liquid crystal antenna.

Solution to Problem

A liquid crystal antenna according to an example embodiment includes a curved liquid crystal panel and is a phased array type, and the liquid crystal panel includes: a liquid crystal layer; and a plurality of antenna elements configured to transmit and receive signals having phases modulated by variable dielectric constant elements including the liquid crystal layer.

A method for manufacturing a liquid crystal antenna according to an example embodiment is a method for manufacturing a liquid crystal antenna of a phased array type including: a step of forming a liquid crystal panel having a planar shape and including a liquid crystal layer and a plurality of antenna elements configured to transmit and receive signals having phases modulated by a variable dielectric constant element including the liquid crystal layer; and a step of curving the liquid crystal panel.

Advantageous Effects of Invention

According to one example embodiment, there are provided the liquid crystal antenna, capable of adapting the transmission/reception direction to 360° in the horizontal direction and reducing the size, the weight, and the cost, and the method for manufacturing the liquid crystal antenna.

EXAMPLE EMBODIMENT

Hereinafter, example embodiments will be described with reference to the drawings. For clarity of description, omission and simplification are made as appropriate in the following description and drawings. Further, in each drawing, the same elements are denoted by the same reference signs, and redundant description is omitted as necessary.

First Example Embodiment

A liquid crystal antenna according to a first example embodiment will be described. First, <Configuration of Liquid Crystal Antenna> will be described. Thereafter, <Configuration of Liquid Crystal Panel> will be described, and <Method for Manufacturing Liquid Crystal Antenna> will be described after <Beam Emission Direction> and <Beam Formation> will be described.

<Configuration of Liquid Crystal Antenna>

Figure 1:
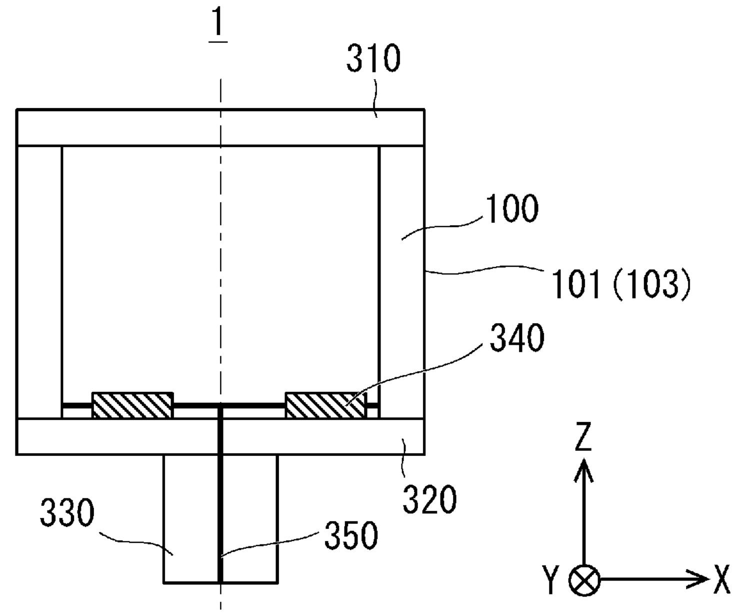
FIG. 1 is a cross-sectional view illustrating a liquid crystal antenna according to a first example embodiment.
Figure 2:
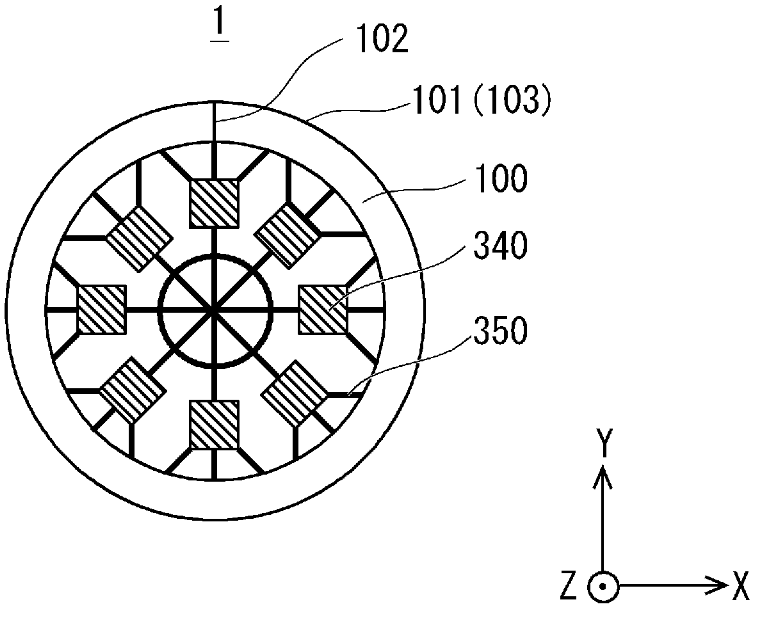
FIG. 2 is a top view illustrating the liquid crystal antenna according to the first example embodiment.

FIG. 1 is a cross-sectional view illustrating a liquid crystal antenna according to a first example embodiment. FIG. 2 is a top view illustrating the liquid crystal antenna according to the first example embodiment. As illustrated in FIGS. 1 and 2, a liquid crystal antenna 1 includes a liquid crystal panel 100. The liquid crystal panel 100 is curved. For example, the liquid crystal panel 100 has a cylindrical shape.

For convenience of description of the liquid crystal antenna 1, an XYZ orthogonal coordinate axis system is introduced. A center-axis direction of the cylindrical liquid crystal panel 100 is defined as a Z-axis direction, and two directions in a plane orthogonal to the Z-axis are defined as an X-axis direction and a Y-axis direction. For example, the Z-axis direction is defined as a vertical direction, and the XY plane is defined as a horizontal plane. Further, a +Z-axis direction is defined as upward, and a −Z-axis direction is defined as downward. Note that the vertical direction, the horizontal plane, upward, and downward are directions for convenience of description of the liquid crystal antenna 1, and do not actually indicate directions in which the liquid crystal antenna 1 is used.

The liquid crystal panel 100 may have a junction 102 along the Z-axis direction on a side surface 101 of the cylindrical shape. For example, the liquid crystal panel 100 may be formed by curving a horizontally long planar panel, which is a base of the liquid crystal panel 100, around a central axis that extends in the Z-axis direction and connecting short sides at the junction 102. For example, it is possible to form the liquid crystal panel 100 that can be deformed to be curved by using a display forming technique including a flexible liquid crystal panel. In the case of liquid crystal, deformation of a molecular sequence due to bending affects a display, and thus, it is difficult to make the liquid crystal flexible to the same extent as organic electro luminescence (EL), but the liquid crystal can be curved to some extent. The liquid crystal panel 100 can be used in the case of being fixed even if being deformed to be curved.

The side surface 101 of the cylindrical liquid crystal panel 100 is also referred to as an outer surface 103. The liquid crystal antenna 1 is formed such that a radio wave is emitted in a normal direction from the outer surface 103 of the liquid crystal panel 100.

The liquid crystal antenna 1 has a structure in which a member that supplies a signal to the liquid crystal panel 100 is combined in addition to the liquid crystal panel 100. For example, the liquid crystal antenna 1 may include a top plate 310, a bottom plate 320, a strut 330, a signal distributor 340, and a signal line 350 in addition to the liquid crystal panel 100.

The top plate 310 has a disk shape, and is arranged as a lid on an upper opening of the cylindrical liquid crystal panel 100. The top plate 310 is omitted in FIG. 2. The bottom plate 320 is arranged so as to occlude a lower opening of the cylindrical liquid crystal panel 100. The strut 330 is arranged to support the bottom plate 320 from below.

The signal distributor 340 is arranged, for example, on the bottom plate 320. Note that the signal distributor 340 may be arranged on the liquid crystal panel 100. The signal distributor 340 and the liquid crystal panel 100 are connected by the signal line 350. The signal distributor 340 supplies a signal to the liquid crystal panel 100 via the signal line 350. When a thin film transistor (TFT) is used for the liquid crystal panel 100, the signal distributor 340 supplies a signal for driving the TFT as well as the signal supplied to the liquid crystal panel 100.

<Configuration of Liquid Crystal Panel>

Figure 3:
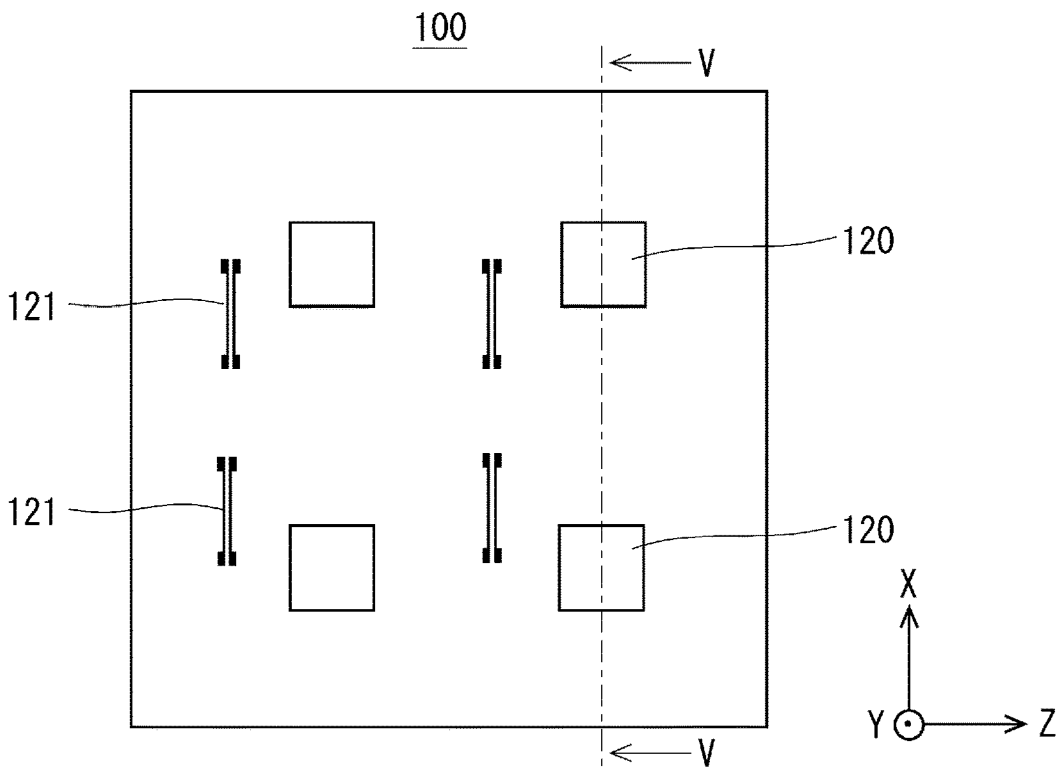
FIG. 3 is an enlarged view illustrating a part of a liquid crystal panel according to the first example embodiment.
Figure 4:
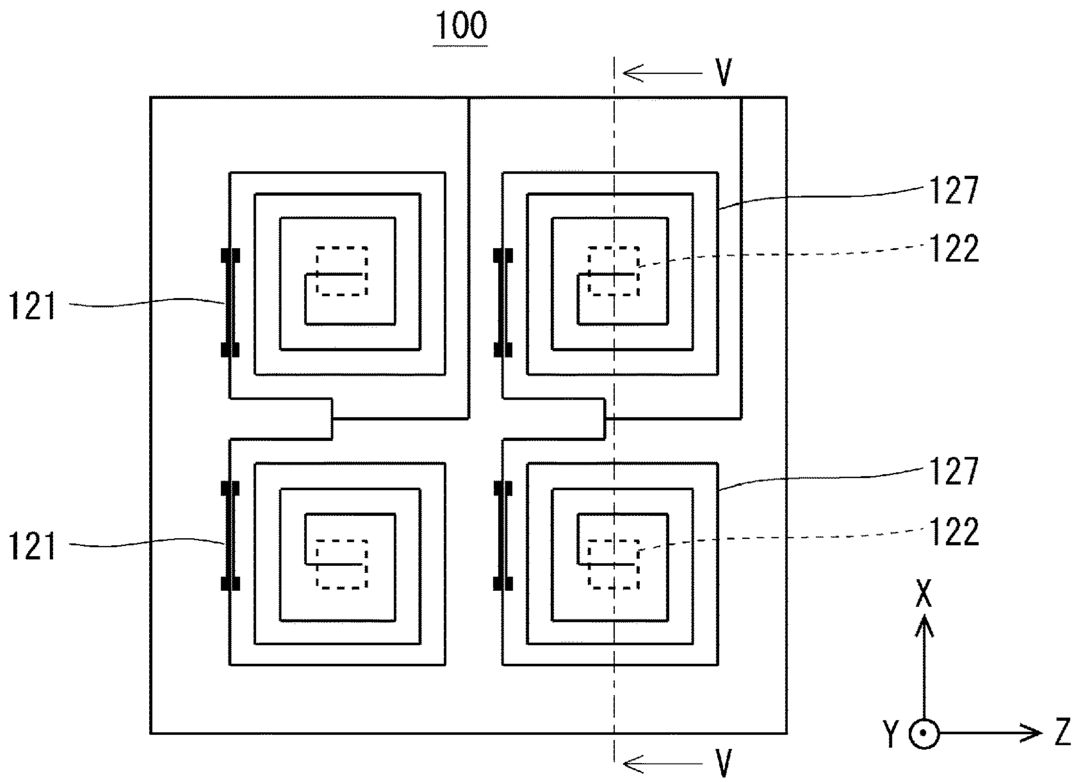
FIG. 4 is an enlarged view illustrating a part of the inside of the liquid crystal panel according to the first example embodiment.
Figure 5:
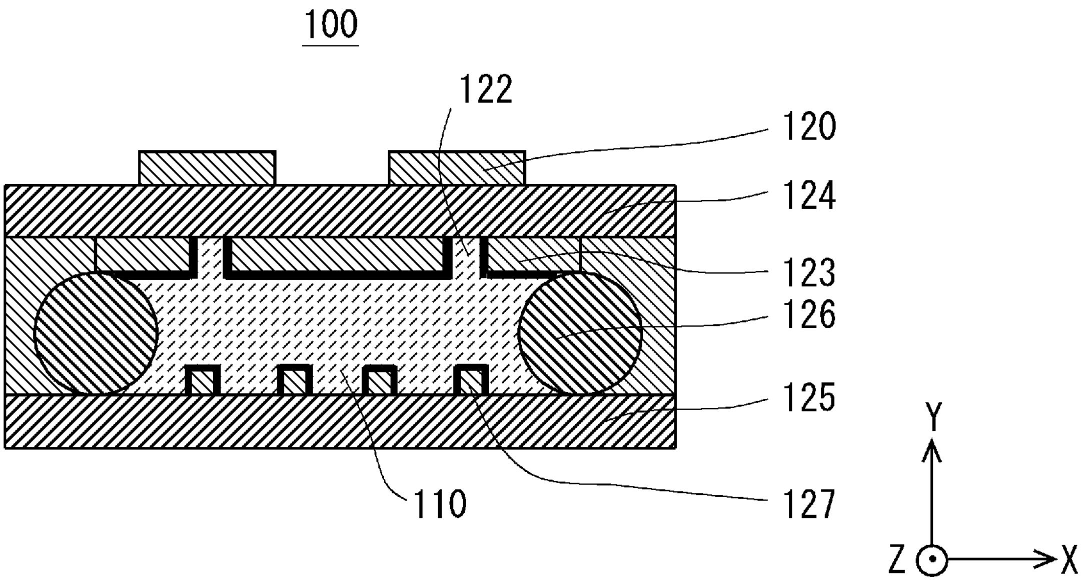
FIG. 5 is a cross-sectional view illustrating a part of the liquid crystal panel according to the first example embodiment, and illustrates a cross section taken along line V-V in FIGS. 3 and 4.

FIG. 3 is an enlarged view illustrating a part of the liquid crystal panel 100 according to the first example embodiment. FIG. 4 is an enlarged view illustrating a part of the inside of the liquid crystal panel 100 according to the first example embodiment. FIG. 5 is a cross-sectional view illustrating a part of the liquid crystal panel 100 according to the first example embodiment, and illustrates a cross section taken along line V-V in FIGS. 3 and 4.

As illustrated in FIGS. 3 to 5, the liquid crystal panel 100 includes a liquid crystal layer 110, a plurality of patch antenna elements 120, a plurality of DC blocking structures 121, slots 122, a ground wiring 123, a front substrate 124, a rear substrate 125, spacers 126, and a spiral wiring 127. The liquid crystal layer 110 is arranged in a space sandwiched between the spacers 126 between the front substrate 124 and the rear substrate 125. The liquid crystal layer 110 has a dielectric constant that can be changed. For example, the dielectric constant of the liquid crystal layer 110 can be changed by applying a bias voltage between the ground wiring 123 and the spiral wiring 127. As a result, a radio wave is emitted from the patch antenna element 120 by electromagnetic coupling via the slot 122. Alternatively, the patch antenna element 120 receives a radio wave.

Therefore, the liquid crystal panel 100 includes the spiral wiring 127 and the ground wiring 123 as variable dielectric constant elements, and includes the patch antenna element 120 as an antenna element. In this case, the dielectric constant of the liquid crystal layer 110 is changed by applying the bias voltage between the spiral wiring 127 and the ground wiring 123. The plurality of patch antenna elements 120 transmit and receive signals having phases modulated by the variable dielectric constant elements including the liquid crystal layer 110. The liquid crystal antenna 1 is a phased array type antenna. For example, the variable dielectric constant element such as an element that applies a bias voltage between the spiral wiring 127 and the ground wiring 123 may include a TFT. As a result, a response speed of the liquid crystal layer 110 can be improved. Note that a configuration including the DC blocking structure 121 and the spiral wiring 127 as illustrated in FIG. 3 to 5 is merely an example, and the phased array type antenna is not limited to such a configuration. For example, a configuration that does not require DC blocking, such as a meander structure, may be adopted.

Figure 6:
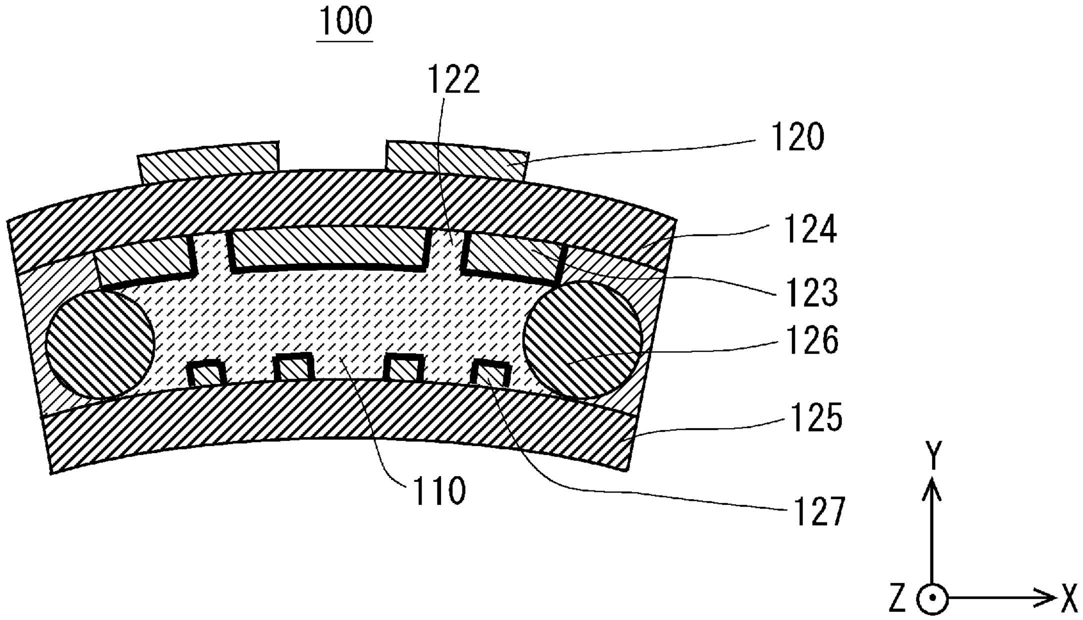
FIG. 6 is a cross-sectional view illustrating the liquid crystal panel according to the first example embodiment.

FIG. 6 is a cross-sectional view illustrating the liquid crystal panel 100 according to the first example embodiment. As illustrated in FIG. 6, the liquid crystal layer 110 may be curved. For example, the liquid crystal layer 110 formed between the front substrate 124 and the rear substrate 125 may be curved together with the front substrate 124 and the rear substrate 125. Further, members other than the liquid crystal layer 110 in the liquid crystal panel 100 may also be curved.

<Emission Direction of Beam>

Figure 7:
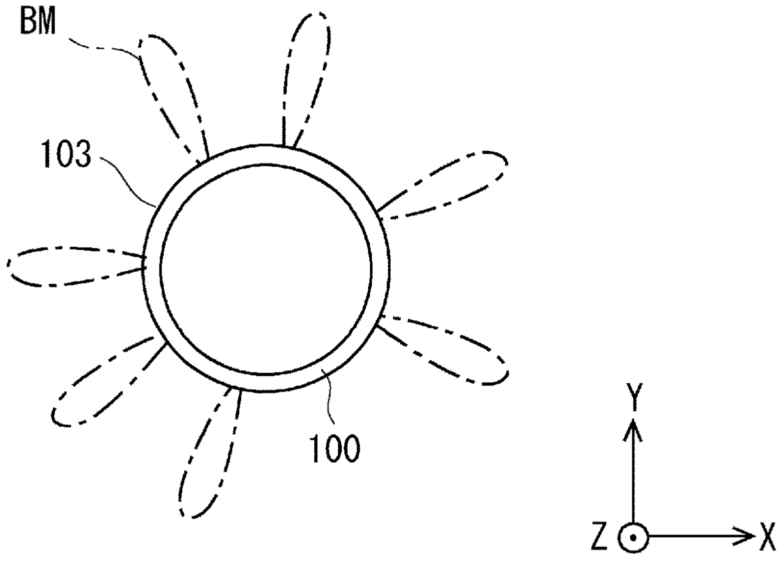
FIG. 7 is a top view illustrating beams of radio waves emitted from the liquid crystal panel of the liquid crystal antenna according to the first example embodiment.
Figure 8:
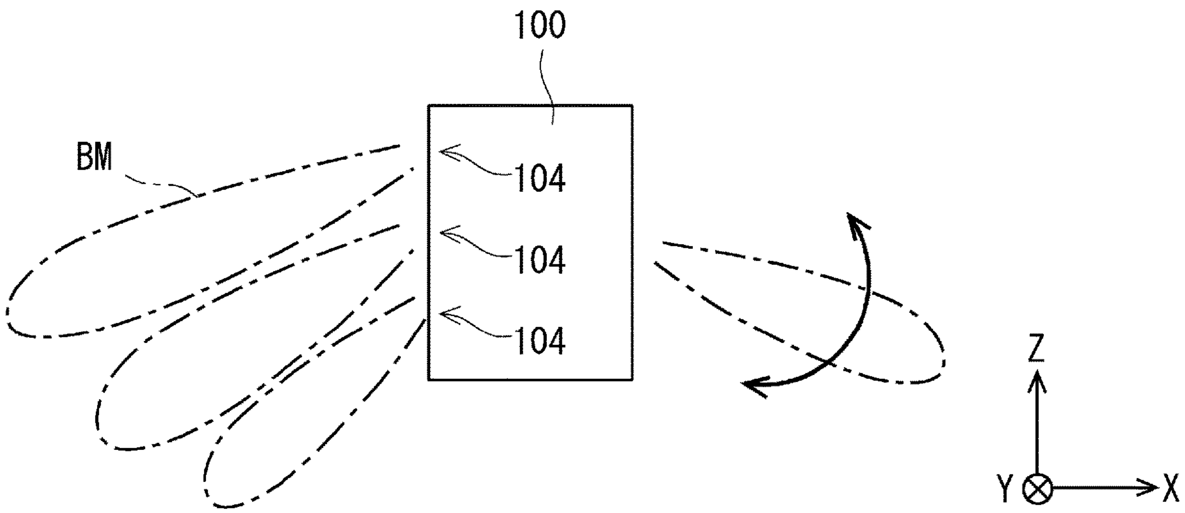
FIG. 8 is a side view illustrating beams of radio waves emitted from the liquid crystal panel of the liquid crystal antenna according to the first example embodiment.

FIG. 7 is a top view illustrating beams of radio waves emitted from the liquid crystal panel 100 of the liquid crystal antenna 1 according to the first example embodiment. FIG. 8 is a side view illustrating beams of radio waves emitted from the liquid crystal panel 100 of the liquid crystal antenna 1 according to the first example embodiment. As illustrated in FIGS. 7 and 8, an emission direction of a beam BM of a radio wave emitted from the liquid crystal panel 100 includes a substantially normal direction of the outer surface 103 of the liquid crystal panel 100. When viewed from above as illustrated in FIG. 7, the beam is emitted from the outer surface 103 of the liquid crystal panel 100 in the normal direction. Thus, steering in the horizontal direction is little. That is, a plurality of the beams BM emitted in the normal direction cover a direction of 360° in an XY plane. Thus, a direction of each of the beams BM only needs to be slightly changed in the XY plane if being changed. Note that reception of a radio wave is similar to reversing the emission direction of the radio wave.

If steering in the Z-axis direction can sufficiently function, a region to be covered can be set to a wide range even in a plane parallel to the Z-axis direction. However, downward steering is sometimes sufficient, for example, in a case where the liquid crystal antenna 1 is used as a base station of a mobile terminal.

As illustrated in FIG. 8, the liquid crystal panel 100 may be divided into a plurality of divided stages 104 in the Z-axis direction in the present example embodiment. A plurality of the beams BM emitted from the plurality of divided stages 104 can cover a wide range of region in a plane parallel to the Z-axis direction. Thus, the steering of the beam BM only needs to be slightly changed when being changed. For example, if a direction of a beam is determined by each of the divided stages 104, it is sufficient to further slightly change the steering.

<Formation of Beam>

Figure 9:
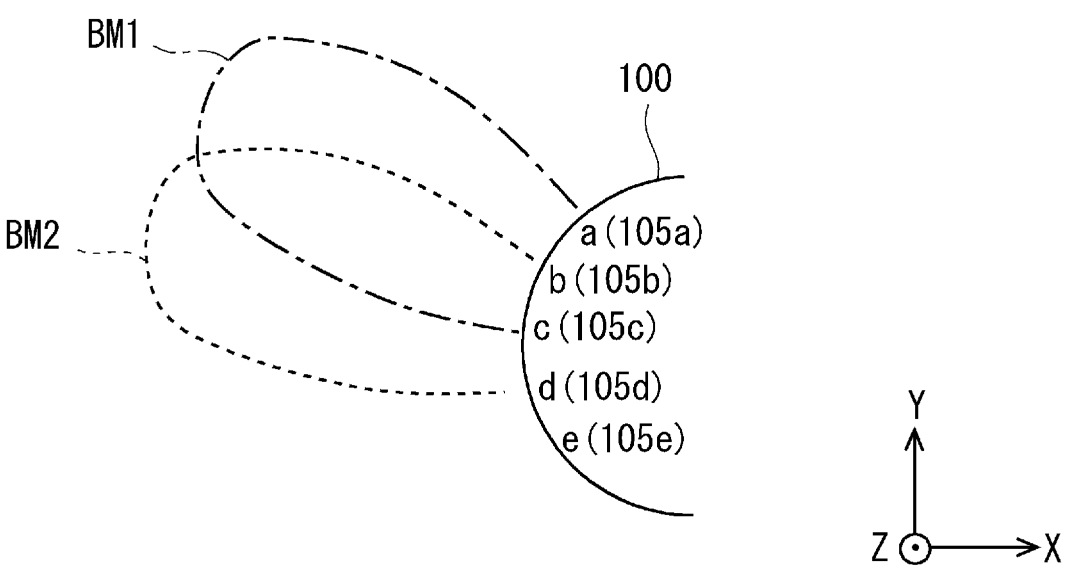
FIG. 9 is a top view illustrating beams of radio waves emitted from the liquid crystal panel of the liquid crystal antenna according to the first example embodiment.

FIG. 9 is a top view illustrating the beam BM of a radio wave emitted from the liquid crystal panel 100 of the liquid crystal antenna 1 according to the first example embodiment. As illustrated in FIG. 9, the liquid crystal panel 100 may include a plurality of divided rows 105*a* to 105*e* extending in the Z-axis direction. Note that the divided rows will be collectively referred to as the divided row 105, and specific divided rows will be referred to with reference signs a to e such as the divided rows 105*a*. Further, the number of the divided rows 105 is not limited to five.

The liquid crystal panel 100 may have a cylindrical shape by arraying and connecting the plurality of divided rows 105*a* to 105*e* along the circumference of the liquid crystal panel 100. In this case, one beam BM may be emitted from one divided row 105. As a result, an emission direction of the beam BM emitted from each of the divided rows 105 can be made different from an emission direction from the adjacent divided row 105. Therefore, the directivity of the radio wave transmitted and received by each divided row 105 can be improved.

Further, a beam BM1 may be formed by a plurality of the divided rows 105*a* to 105*c*, and a beam BM2 may be formed by a plurality of the divided rows 105*b* to 105*d* or the like. With such a configuration, it is possible to perform transmission and reception in a wider range than a range in which transmission and reception can be performed by the single divided row 105. For example, in a case where the liquid crystal antenna 1 is a base station of a mobile terminal, a person who holds the mobile terminal moves with respect to the liquid crystal antenna 1. At this time, the divided rows 105 communicating with the mobile terminal can be smoothly shifted over the divided rows 105*a* to 105*c* while maintaining a communication state so as to follow the movement of the mobile terminal.

Further, when the plurality of divided rows 105*a* to 105*e* are used for one signal, an antenna area can be increased so that the sensitivity can be improved.

<Method for Manufacturing Liquid Crystal Antenna>

Figure 10:
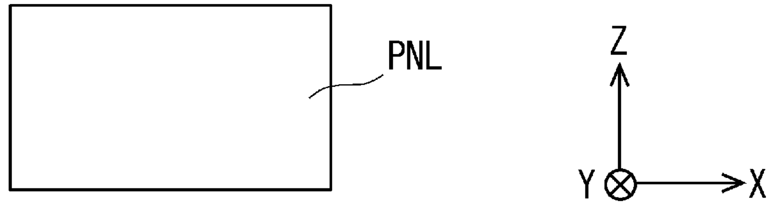
FIG. 10 is a process diagram illustrating a method for manufacturing the liquid crystal antenna according to the first example embodiment.
Figure 11:
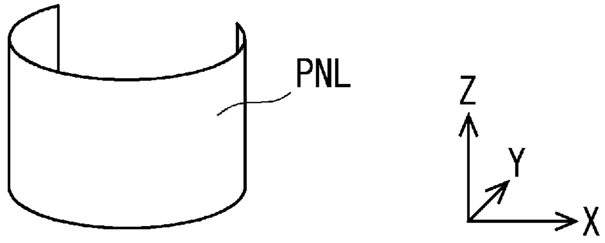
FIG. 11 is a process diagram illustrating the method for manufacturing the liquid crystal antenna according to the first example embodiment.
Figure 12:
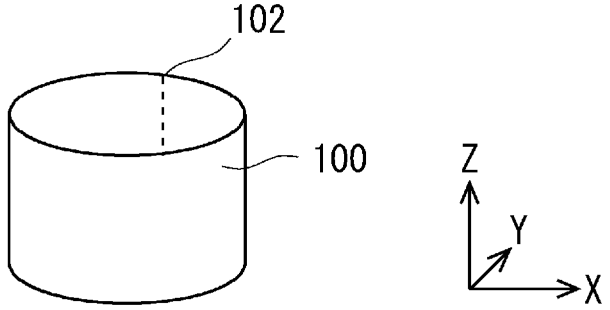
FIG. 12 is a process diagram illustrating the method for manufacturing the liquid crystal antenna according to the first example embodiment.

Next, a method for manufacturing the liquid crystal antenna 1 will be described. FIGS. 10 to 12 are process diagrams illustrating the method for manufacturing the liquid crystal antenna according to the first example embodiment. As illustrated in FIG. 10, first, a horizontally long planar liquid crystal panel PNL as a base of the liquid crystal panel 100 is formed. The liquid crystal panel PNL includes the liquid crystal layer 110 and a plurality of antenna elements that transmit and receive signals having phases modulated by variable dielectric constant elements including the liquid crystal layer 110. When forming the liquid crystal panel PNL, the liquid crystal panel PNL may be formed to include the spiral wiring 127 and the ground wiring 123 as the variable dielectric constant elements and include the patch antenna element 120 as the antenna element. Then, the liquid crystal layer 110 is formed such that a dielectric constant is changed by applying a bias voltage between the spiral wiring 127 and the ground wiring 123. Further, the variable dielectric constant elements may include a TFT.

Next, as illustrated in FIG. 11, the liquid crystal panel PNL is curved around a central axis extending in the Z-axis direction. When curving the liquid crystal panel PNL, the liquid crystal layer 110 may be curved. Further, when curving the liquid crystal panel PNL, an emission direction of the beam BM of a radio wave emitted from the liquid crystal panel PNL may include a substantially normal direction of an outer surface of the liquid crystal panel PNL.

Next, the short sides of the liquid crystal panel 100 may be connected at the junction 102 to form the liquid crystal panel PNL into a cylindrical shape by connecting as illustrated in FIG. 12. Then, the liquid crystal antenna 1 illustrated in FIGS. 1 and 2 can be manufactured by attaching a structure combined with a member that supplies a signal to the liquid crystal panel 100. In this manner, it is possible to manufacture the liquid crystal antenna 1 in which a transmission/reception direction of a radio wave can be adopted to 360° in the horizontal direction by the single antenna.

Note that when forming the liquid crystal panel PNL into the cylindrical shape, the liquid crystal panel PNL may be formed to include a plurality of the divided rows 105 and formed into the cylindrical shape by connecting the plurality of divided rows 105. Further, when forming the liquid crystal panel PNL into the cylindrical shape, an emission direction of the beam BM emitted from each of the divided rows 105 may be made different from an emission direction from the adjacent divided row 105.

Figure 13:
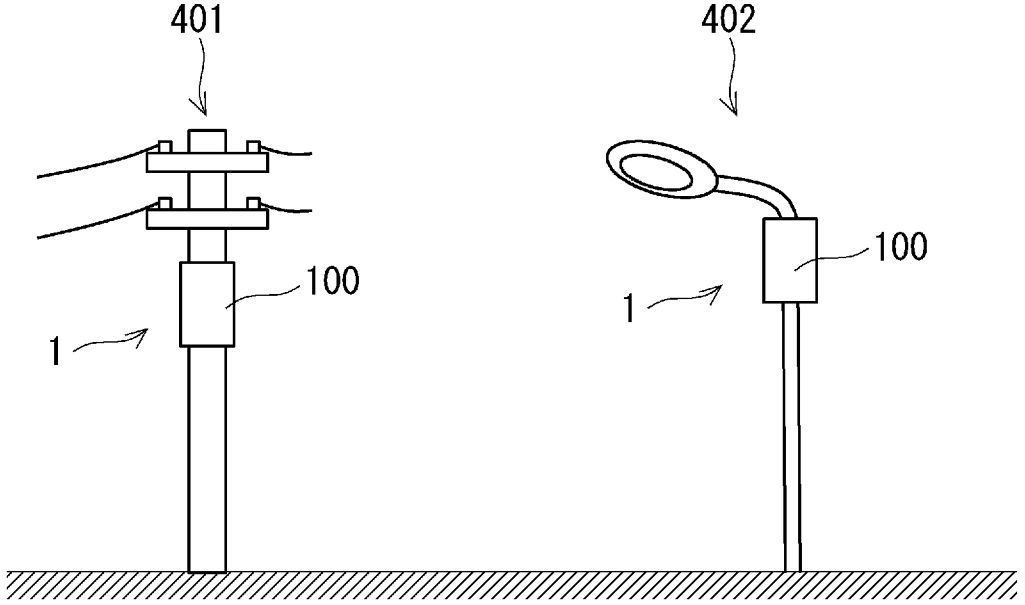
FIG. 13 is a view illustrating a case where the liquid crystal antenna according to the first example embodiment is arranged on a utility pole and a street lamp post.

FIG. 13 is a view illustrating a case where the liquid crystal antenna 1 according to the first example embodiment is arranged on a utility pole and a street lamp post. As illustrated in FIG. 13, the liquid crystal antenna 1 may be arranged on a utility pole 401 and a post of a street lamp 402. In this case, the liquid crystal panel 100 is arranged around each of the utility pole 401 and the post of the street lamp 402. The liquid crystal panel 100 has a space in a central portion, and can be installed so as to be wound around the post or the like. Thus, it can be installed on the utility pole 401 and the post of the street lamp 402 in addition to installation on a rooftop of a building or the like. Further, the liquid crystal panel 100 is lightweight, and thus, the influence on the strength of the utility pole 401 and the street lamp 402 can be suppressed. Note that the liquid crystal panel 100 may be arranged around a columnar structure protruding in the vertical direction from the ground, such as a telegraph pole, a signal light, or the like, in addition to the utility pole 401 and the street lamp 402.

Figure 14:
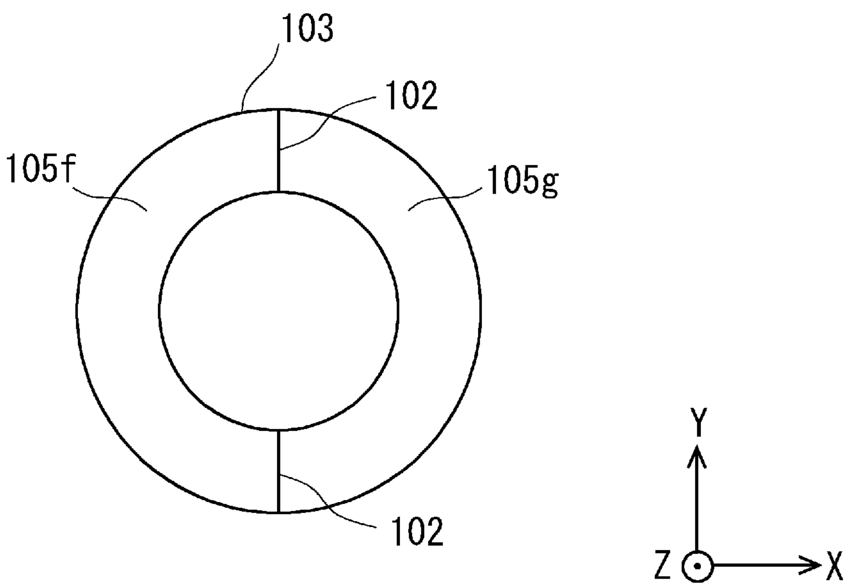
FIG. 14 is a top view illustrating divided rows of the liquid crystal panel according to the first example embodiment.
Figure 15:
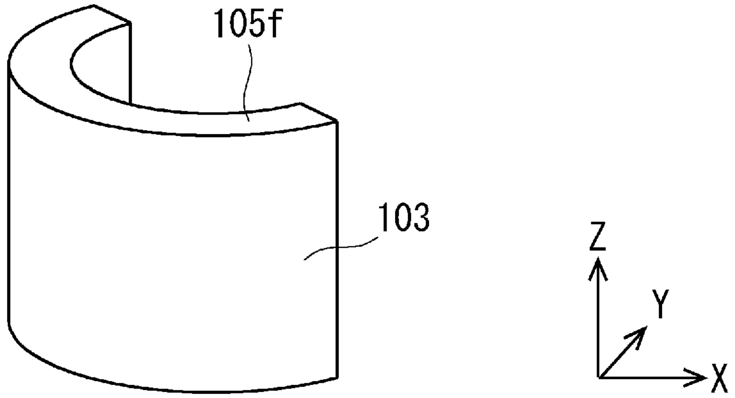
FIG. 15 is a perspective view illustrating the divided row of the liquid crystal panel according to the first example embodiment.

FIG. 14 is a top view illustrating a divided row of the liquid crystal panel according to the first example embodiment. FIG. 15 is a perspective view illustrating a divided row of the liquid crystal panel according to the first example embodiment. As illustrated in FIGS. 14 and 15, the liquid crystal panel 100 may have two divided rows **105*f* and 105*g* divided in a semi-cylindrical shape. Each of the divided rows 105*f* and 105*g* has a semi-cylindrical shape obtained by dividing a cylindrical shape by a plane including a central axis. A cross section orthogonal to the central axis of the divided rows 105*f* and 105*g* is a semicircle having a circumference of 180°. The liquid crystal panel 100 has a cylindrical shape by connecting the plurality of divided rows 105*f* and 105*g* at the junctions 102**.

In FIGS. 14 and 15, the junctions 102 are provided at two places on the cylindrical outer surface 103. Note that, instead of having the two divided rows **105*f* and 105*g*, the liquid crystal panel 100** may be formed by connecting three divided row each of which is one-third circle having a circumference of 120° in cross section, or may be formed by connecting four divided rows each of which is a quarter circle having a circumference of 90° in cross section.

Note that, in a case where the liquid crystal antenna 1 is mounted on the existing utility pole 401 and the existing post of the street lamp 402, it is difficult to insert and mount the liquid crystal antenna 1 from distal ends thereof. Thus, it is desirable to attach perform mounting using the divided rows 105 as illustrated in FIGS. 14 and 15. Further, in the case of the divided rows 105, it is easy to cover the surface including the inner surface, and it is easy to form a waterproof structure. Further, it is unnecessary to curve the liquid crystal panel PNL on site.

Next, effects of the present example embodiment will be described. The liquid crystal antenna 1 of the present example embodiment includes the curved liquid crystal panel 100. Thus, the transmission/reception direction of the radio wave can be adapted to 360° in the horizontal direction. For example, since the substantially normal direction of the curved liquid crystal panel 100 is set as the emission direction of the beam BM, it is possible to cover 360° in the horizontal direction. Thus, a change in a steering direction of each of the beams BM can be designed to be small. Further, a decrease in the amount of the change in the steering direction contributes to an increase in a speed of an operation.

Further, since a liquid crystal display formation technique is used, the liquid crystal antenna 1 is small, thin, and lightweight, and thus, the cost can be reduced. It is easy to install the liquid crystal antenna 1 to the utility pole 401 and the post of the street lamp 402 or the like by taking advantages of the small size, the thin size, and the light weight. Note that the liquid crystal panel 100 has been described to have the cylindrical shape, but the shape is not necessarily limited to the cylindrical shape. For example, when being mounted to a vehicle, the liquid crystal antenna 1 may be curved so as to match a curved body of the vehicle. The liquid crystal antenna 1 can be formed in a flexible shape, and thus, can be formed in any curved surface as necessary.

Second Example Embodiment

Figure 16:
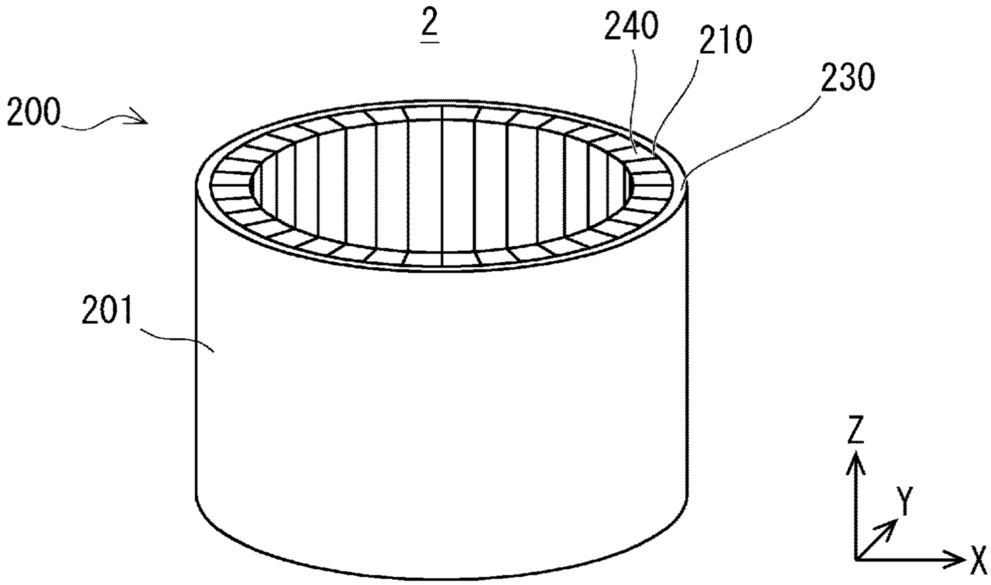
FIG. 16 is a perspective view illustrating a liquid crystal antenna according to a second example embodiment.
Figure 17:
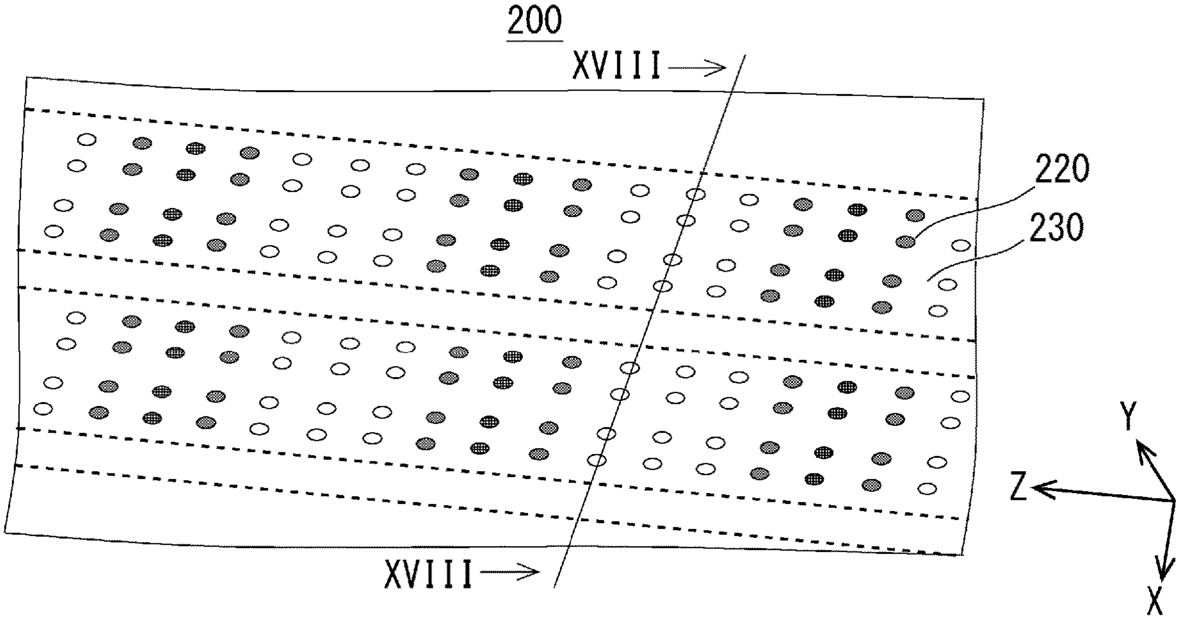
FIG. 17 is an enlarged view illustrating a part of a liquid crystal panel according to the second example embodiment.
Figure 18:
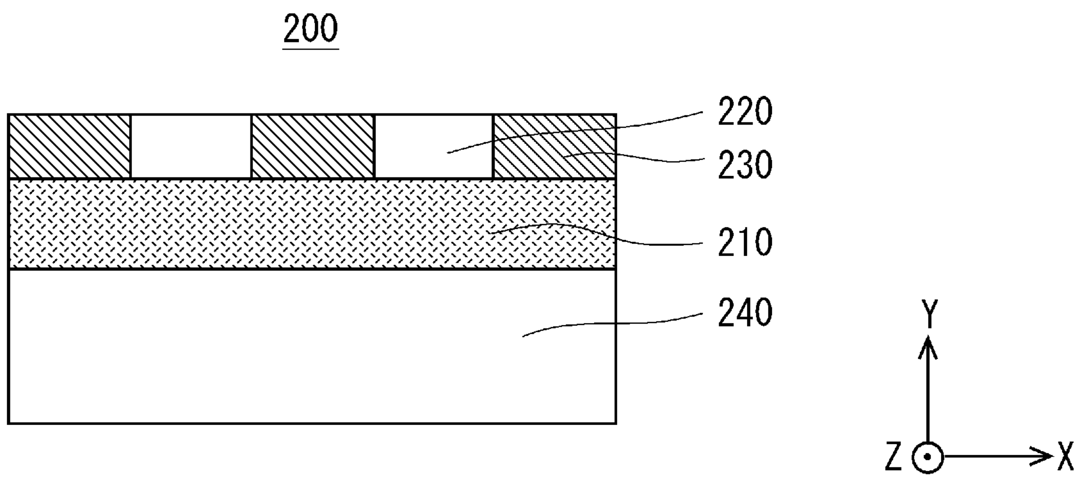
FIG. 18 is a cross-sectional view illustrating a part of the liquid crystal panel according to the second example embodiment, and illustrates a cross section taken along line XVIII-XVIII in FIG. 17.

Next, a liquid crystal antenna according to a second example embodiment will be described. FIG. 16 is a perspective view illustrating the liquid crystal antenna according to the second example embodiment. FIG. 17 is an enlarged view illustrating a part of a liquid crystal panel 200 according to the second example embodiment. FIG. 18 is a cross-sectional view illustrating a part of the liquid crystal panel 200 according to the second example embodiment, and illustrates a cross section taken along line XVIII-XVIII in FIG. 17.

As illustrated in FIGS. 16 to 18, a liquid crystal antenna 2 includes the liquid crystal panel 200. The liquid crystal panel 200 according to the second example embodiment includes a liquid crystal layer 210, a metasurface layer 230, and a plurality of traveling wave tubes 240. The metasurface layer 230 is arranged on an outer surface 201 side of the liquid crystal layer 210 and is laminated concentrically with the liquid crystal layer 210. The plurality of traveling wave tubes 240 are arranged on the inner side of the liquid crystal layer 210. Each of the traveling wave tubes 240 extends in the Z-axis direction and is arranged along a circumference of the liquid crystal panel 200. A dielectric constant of the liquid crystal layer 210 is controlled by, for example, a TFT (not illustrated) or the like.

The metasurface layer 230 has a plurality of opening portions 220 penetrating from the outer surface 201 to the liquid crystal layer 210. The liquid crystal panel 200 has the metasurface layer 230 as a variable dielectric constant element, and has the opening portions 220 formed in the metasurface layer 230 as antenna elements. Then, the liquid crystal panel 200 changes a resonance condition of the liquid crystal layer 210 and the metasurface layer 230, and causes a radio wave from the traveling wave tube 240 to leak from the opening portion 220 as a signal. In this manner, the liquid crystal panel 200 transmits and receives the signal whose phase has been modulated by the variable dielectric constant element including the liquid crystal layer 210.

The liquid crystal panel 200 may have a plurality of divided rows including portions of the liquid crystal layer 210 and the metasurface layer 230 on each of the traveling wave tubes 240. As a result, an emission direction of a beam emitted from each of the divided rows may be made different from an emission direction from an adjacent divided row similarly to the first example embodiment. Further, in a case where liquid crystal antenna 2 is used as a base station of a mobile terminal, the plurality of divided rows communicating with the mobile terminal may sequentially be shifted to follow movement of the mobile terminal.

Figure 19:
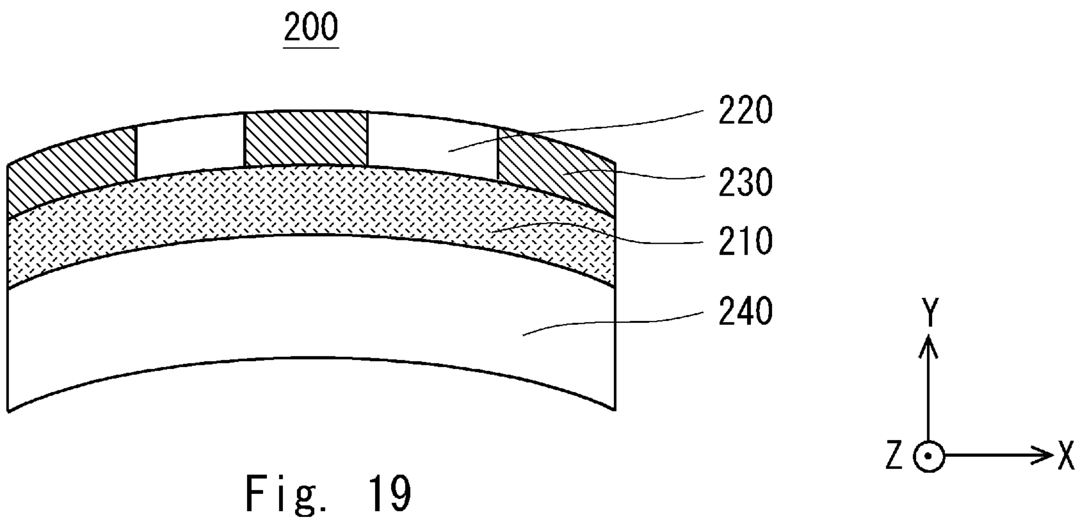
FIG. 19 is a cross-sectional view illustrating the liquid crystal panel according to the second example embodiment.

FIG. 19 is a cross-sectional view illustrating the liquid crystal panel 200 according to the second example embodiment. As illustrated in FIG. 19, the liquid crystal layer 210 may be curved. For example, the liquid crystal layer 210 formed between the metasurface layer 230 and the traveling wave tube 240 may be curved together with the metasurface layer 230 and the traveling wave tube 240. Further, members other than the liquid crystal layer 210, the metasurface layer 230, and the traveling wave tube 240 in the liquid crystal panel 200 may also be curved.

According to the present example embodiment, the liquid crystal panel 200 including the metasurface layer 230 can also be curved, and a transmission/reception direction of the radio wave can cover 360° in the horizontal direction. Other configurations and effects are included in the description of the first example embodiment.

Note that the present invention is not limited to the above example embodiments, and can be appropriately changed without departing from the scope of the present invention. For example, a combination of the configurations of the first and second example embodiments is also included in the technical scope of the present embodiment.

Some or all of the above-described example embodiments may be described as in the following Supplementary Notes, but are not limited to the following Supplementary Notes.

(Supplementary Note 1)

A liquid crystal antenna of a phased array type, including a curved liquid crystal panel, in which the liquid crystal panel includes:

a liquid crystal layer; and a plurality of antenna elements configured to transmit and receive signals having phases modulated by a variable dielectric constant element including the liquid crystal layer.

(Supplementary Note 2)

The liquid crystal antenna according to Supplementary Note 1, in which the liquid crystal layer is curved.

(Supplementary Note 3)

The liquid crystal antenna according to Supplementary Note 1 or 2, in which the liquid crystal panel has a cylindrical shape.

(Supplementary Note 4)

The liquid crystal antenna according to Supplementary Note 3, in which the liquid crystal panel includes a plurality of divided rows, and has the cylindrical shape obtained by connecting the plurality of divided rows.

(Supplementary Note 5)

The liquid crystal antenna according to Supplementary Note 4, in which an emission direction of a beam emitted from each of the divided rows is different from an emission direction from the divided row that is adjacent.

(Supplementary Note 6)

The liquid crystal antenna according to any one of Supplementary Notes 1 to 5, in which an emission direction of a beam of a radio wave emitted from the liquid crystal panel includes a substantially normal direction of an outer surface of the liquid crystal panel.

(Supplementary Note 7)

The liquid crystal antenna according to any one of Supplementary Notes 1 to 6, in which the liquid crystal panel includes a spiral wiring and a ground wiring as the variable dielectric constant element, includes patch antenna elements as the antenna elements, and changes a dielectric constant of the liquid crystal layer by applying a bias voltage between the spiral wiring and the ground wiring.

(Supplementary Note 8)

The liquid crystal antenna according to any one of Supplementary Notes 1 to 6, in which the liquid crystal panel further includes a plurality of traveling wave tubes, includes a metasurface layer as the variable dielectric constant element, includes opening portions formed in the metasurface layer as the antenna elements, and changes a resonance condition of the liquid crystal layer and the metasurface layer to cause radio waves from the traveling wave tubes to leak as the signals from the opening portions.

(Supplementary Note 9)

The liquid crystal antenna according to any one of Supplementary Notes 1 to 8, in which the variable dielectric constant element includes a thin film transistor.

(Supplementary Note 10)

The liquid crystal antenna according to any one of Supplementary Notes 1 to 9, in which the liquid crystal panel is arranged around at least any of a utility pole, a telegraph pole, a street lamp, and a signal light.

(Supplementary Note 11)

A method for manufacturing a liquid crystal antenna of a phased array type, the method including:

a step of forming a liquid crystal panel having a planar shape and including a liquid crystal layer and a plurality of antenna elements configured to transmit and receive signals having phases modulated by a variable dielectric constant element including the liquid crystal layer; and a step of curving the liquid crystal panel.

(Supplementary Note 12)

The method for manufacturing a liquid crystal antenna according to Supplementary Note 11, in which the liquid crystal layer is curved in the step of curving the liquid crystal panel.

(Supplementary Note 13)

The method for manufacturing a liquid crystal antenna according to Supplementary Note 11 or 12, further including a step of forming the liquid crystal panel into a cylindrical shape.

(Supplementary Note 14)

The method for manufacturing a liquid crystal antenna according to Supplementary Note 13, in which the liquid crystal panel is formed to include a plurality of divided rows and is formed into the cylindrical shape by connecting the plurality of divided rows in the step of forming the liquid crystal panel into the cylindrical shape.

(Supplementary Note 15)

The method for manufacturing a liquid crystal antenna according to Supplementary Note 14, in which an emission direction of a beam emitted from each of the divided rows is made different from an emission direction from the divided row that is adjacent in the step of forming the liquid crystal panel into the cylindrical shape.

(Supplementary Note 16)

The method for manufacturing a liquid crystal antenna according to any one of Supplementary Notes 11 to 15, in which an emission direction of a beam of a radio wave emitted from the liquid crystal panel is set to include a substantially normal direction of an outer surface of the liquid crystal panel in the step of curving the liquid crystal panel.

(Supplementary Note 17)

The method for manufacturing a liquid crystal antenna according to any one of Supplementary Notes 11 to 16, in which in the step of forming the liquid crystal panel, the liquid crystal panel is formed to include a spiral wiring and a ground wiring as the variable dielectric constant element, include patch antenna elements as the antenna elements, and change a dielectric constant of the liquid crystal layer by applying a bias voltage between the spiral wiring and the ground wiring.

(Supplementary Note 18)

The method for manufacturing a liquid crystal antenna according to any one of Supplementary Notes 11 to 16, in which in the step of forming the liquid crystal panel, the liquid crystal panel is formed to further include a plurality of traveling wave tubes, include a metasurface layer as the variable dielectric constant element, include opening portions formed in the metasurface layer as the antenna elements, and change a resonance condition of the liquid crystal layer and the metasurface layer to cause radio waves from the traveling wave tubes to leak as the signals from the opening portions.

(Supplementary Note 19)

The method for manufacturing a liquid crystal antenna according to any one of Supplementary Notes 11 to 18, in which the variable dielectric constant element is formed to include a thin film transistor in the step of forming the liquid crystal panel.

(Supplementary Note 20)

The method for manufacturing a liquid crystal antenna according to Supplementary Note 14, in which the plurality of divided rows are connected around at least one of a utility pole, a telegraph pole, a street lamp, and a signal light to form the cylindrical shape in the step of forming the liquid crystal panel into the cylindrical shape.

This application claims priority based on Japanese Patent Application No. 2021-057212 filed on Mar. 30, 2021, the entire disclosure of which is incorporated herein.

REFERENCE SIGNS LIST

1 LIQUID CRYSTAL ANTENNA
100 LIQUID CRYSTAL PANEL
101 SIDE SURFACE
102 JUNCTION
103 OUTER SURFACE
104 DIVIDED STAGE
105, 105*a*, 105*b*, 105*c*, 105*d*, 105*e* DIVIDED ROW
105*f*, 105*g* DIVIDED ROW
110 LIQUID CRYSTAL LAYER
120 PATCH ANTENNA ELEMENT
121 DC BLOCKING STRUCTURE
122 SLOT
123 GROUND WIRING
124 FRONT SUBSTRATE
125 REAR SUBSTRATE
126 SPACER
127 SPIRAL WIRING
200 LIQUID CRYSTAL PANEL
201 OUTER SURFACE
210 LIQUID CRYSTAL LAYER
220 OPENING PORTION
230 METASURFACE LAYER
240 TRAVELING WAVE TUBE
310 TOP PLATE
320 BOTTOM PLATE
330 STRUT
340 SIGNAL DISTRIBUTOR
350 SIGNAL LINE
401 UTILITY POLE
402 STREET LAMP
BM, BM1, BM2 BEAM
PNL LIQUID CRYSTAL PANEL

The invention claimed is:

1. A liquid crystal antenna of a phased array type, comprising a curved liquid crystal panel, wherein the liquid crystal panel includes:

a liquid crystal layer; and a plurality of antenna elements configured to transmit and receive signals having phases modulated by a variable dielectric constant element including the liquid crystal layer, wherein the liquid crystal panel further includes a plurality of divided rows, and has a cylindrical shape obtained by connecting the plurality of divided rows.

2. The liquid crystal antenna according to claim 1, wherein the liquid crystal layer is curved.

3. The liquid crystal antenna according to claim 1, wherein an emission direction of a beam emitted from each of the divided rows is different from an emission direction from the divided row that is adjacent.

4. The liquid crystal antenna according to claim 1, wherein an emission direction of a beam of a radio wave emitted from the liquid crystal panel includes a substantially normal direction of an outer surface of the liquid crystal panel.

5. The liquid crystal antenna according to claim 1, wherein the liquid crystal panel includes a spiral wiring and a ground wiring as the variable dielectric constant element, includes patch antenna elements as the antenna elements, and changes a dielectric constant of the liquid crystal layer by applying a bias voltage between the spiral wiring and the ground wiring.

6. The liquid crystal antenna according to claim 1, wherein the liquid crystal panel further includes a plurality of traveling wave tubes, includes a metasurface layer as the variable dielectric constant element, includes opening portions formed in the metasurface layer as the antenna elements, and changes a resonance condition of the liquid crystal layer and the metasurface layer to cause radio waves from the traveling wave tubes to leak as the signals from the opening portions.

7. The liquid crystal antenna according to claim 1, wherein the variable dielectric constant element includes a thin film transistor.

8. The liquid crystal antenna according to claim 1, wherein the liquid crystal panel is arranged around at least any of a utility pole, a telegraph pole, a street lamp, and a signal light.

9. A method for manufacturing a liquid crystal antenna of a phased array type, the method comprising:

forming a liquid crystal panel having a planar shape and including a liquid crystal layer and a plurality of antenna elements configured to transmit and receive signals having phases modulated by a variable dielectric constant element including the liquid crystal layer; and curving the liquid crystal panel, the method further comprising forming the liquid crystal panel into a cylindrical shape, wherein the liquid crystal panel is formed to include a plurality of divided rows and is formed into the cylindrical shape by connecting the plurality of divided rows in the forming of the liquid crystal panel into the cylindrical shape.

10. The method for manufacturing a liquid crystal antenna according to claim 9, wherein the liquid crystal layer is curved in the step of curving of the liquid crystal panel.

11. The method for manufacturing a liquid crystal antenna according to claim 9, wherein an emission direction of a beam emitted from each of the divided rows is made different from an emission direction from the divided row that is adjacent in the forming of the liquid crystal panel into the cylindrical shape.

12. The method for manufacturing a liquid crystal antenna according to claim 9, wherein an emission direction of a beam of a radio wave emitted from the liquid crystal panel is set to include a substantially normal direction of an outer surface of the liquid crystal panel in the curving of the liquid crystal panel.

13. The method for manufacturing a liquid crystal antenna according to claim 9, wherein in the forming of the liquid crystal panel, the liquid crystal panel is formed to include a spiral wiring and a ground wiring as the variable dielectric constant element, include patch antenna elements as the antenna elements, and change a dielectric constant of the liquid crystal layer by applying a bias voltage between the spiral wiring and the ground wiring.

14. The method for manufacturing a liquid crystal antenna according to claim 9, wherein in the forming of the liquid crystal panel, the liquid crystal panel is formed to further include a plurality of traveling wave tubes, include a metasurface layer as the variable dielectric constant element, include opening portions formed in the metasurface layer as the antenna elements, and change a resonance condition of the liquid crystal layer and the metasurface layer to cause radio waves from the traveling wave tubes to leak as the signals from the opening portions.

15. The method for manufacturing a liquid crystal antenna according to claim 9, wherein the variable dielectric constant element is formed to include a thin film transistor in the forming of the liquid crystal panel.

16. The method for manufacturing a liquid crystal antenna according to claim 9, wherein the plurality of divided rows are connected around at least any of a utility pole, a telegraph pole, a street lamp, and a signal light to form the cylindrical shape in the forming of the liquid crystal panel into the cylindrical shape.

17. A liquid crystal antenna of a phased array type, comprising a curved liquid crystal panel, wherein the liquid crystal panel includes:

a liquid crystal layer; and a plurality of antenna elements configured to transmit and receive signals having phases modulated by a variable dielectric constant element including the liquid crystal layer, wherein the liquid crystal panel further includes a plurality of traveling wave tubes, includes a metasurface layer as the variable dielectric constant element, includes opening portions formed in the metasurface layer as the antenna elements, and changes a resonance condition of the liquid crystal layer and the metasurface layer to cause radio waves from the traveling wave tubes to leak as the signals from the opening portions.

18. The liquid crystal antenna according to claim 17, wherein the liquid crystal layer is curved.

19. The liquid crystal antenna according to claim 17, wherein the liquid crystal panel has a cylindrical shape.

20. The liquid crystal antenna according to claim 17, wherein an emission direction of a beam of a radio wave emitted from the liquid crystal panel includes a substantially normal direction of an outer surface of the liquid crystal panel.

* * * * *